(12) United States Patent
Huang et al.

(10) Patent No.: US 8,326,980 B2
(45) Date of Patent: Dec. 4, 2012

(54) USING DNS REFLECTION TO MEASURE NETWORK PERFORMANCE

(75) Inventors: Cheng Huang, Redmond, WA (US); Nicholas Leonard Holt, Seattle, WA (US); Albert G. Greenberg, Seattle, WA (US); Jin Li, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/769,270

(22) Filed: Apr. 28, 2010

(65) Prior Publication Data

US 2011/0270964 A1  Nov. 3, 2011

(51) Int. Cl.
G06F 15/173 (2006.01)
G06F 15/16 (2006.01)
(52) U.S. Cl. .................. 709/224; 709/239; 709/219
(58) Field of Classification Search ............... None
See application file for complete search history.

(56) References Cited

U.S. PATENT DOCUMENTS

| | | | |
|---|---|---|---|
| 6,553,413 B1 * | 4/2003 | Leighton et al. | 709/219 |
| 7,305,429 B2 | 12/2007 | Borella | |
| 7,363,367 B2 * | 4/2008 | Lloyd et al. | 709/224 |
| 7,441,045 B2 | 10/2008 | Skene et al. | |
| 7,574,499 B1 | 8/2009 | Swildens et al. | |
| 7,624,169 B2 | 11/2009 | Lisiecki et al. | |
| 2001/0052016 A1 * | 12/2001 | Skene et al. | 709/226 |
| 2003/0065762 A1 | 4/2003 | Stolorz et al. | |
| 2003/0105865 A1 | 6/2003 | McCanne et al. | |
| 2004/0221019 A1 * | 11/2004 | Swildens et al. | 709/217 |
| 2006/0112176 A1 | 5/2006 | Liu et al. | |
| 2007/0255829 A1 | 11/2007 | Pecus et al. | |
| 2008/0215718 A1 | 9/2008 | Stolorz et al. | |
| 2009/0013083 A9 | 1/2009 | Garcia-Luna-Aceves et al. | |

OTHER PUBLICATIONS

"International Search Report", Mailed Date: Nov. 30, 2011, Application No. PCT/US2011/034007, Filed Date: Apr. 26, 2011, pp. 10.

Mulzer, Marc., "Increasing Web Site Performance: Advanced Infrastructure and Caching Concepts", Retrieved at << http://www.dell.com/content/topics/global.aspx/power/en/ps1q02_mulzer?c=us&l=en&cs=555 >>, Mar. 2002, pp. 4.

"Akamai Global Traffic Management", Retrieved at << http://www.akamai.com/dl/feature_sheets/Akamai_Global_Traffic_Management.pdf>>, Retrieved Date: Jan. 28, 2010, pp. 2.

Mao, et al., "A Precise and Efficient Evaluation of the Proximity between Web Clients and their Local DNS Servers", Retrieved at << http://www.eecs.umich.edu/~zmao/Papers/usenix.pdf>>, USENIX Annual Technical Conference, Proceedings of the General Track of the annual conference on USENIX Annual Technical Conference, Jun. 10-15, 2002, pp. 14.

(Continued)

*Primary Examiner* — John B. Walsh
(74) *Attorney, Agent, or Firm* — Wolfe-SBMC

(57) ABSTRACT

A top level domain name system (DNS) server receives a DNS query from a local DNS resolver, the DNS query requesting a network address corresponding to a domain name. The top level DNS server reflects the local DNS resolver to a reflector DNS server. The reflector DNS server reflects the local DNS resolver to a collector DNS server, which in turn returns the network address to the local DNS resolver. The reflector DNS server and collector DNS server are both in the same data center, and one or more network performance measurements for communications between the local DNS resolver and the data center are determined based on the communications between the local DNS resolver and both the reflector DNS server and the collector DNS server.

19 Claims, 4 Drawing Sheets

OTHER PUBLICATIONS

Pang, et al., "On the responsiveness of dns-based network control.", Retrieved at << http://conferences.sigcomm.org/imc/2004/papers/p21-pang.pdf >>, Internet Measurement Conference, Proceedings of the 4th ACM SIGCOMM conference on Internet measurement, Oct. 25-27, 2004, pp. 21-26.

Agarwal, et al., "Matchmaking for online games and and Other Latency-Sensitive P2P Systems", Retrieved at << http://research.microsoft.com/en-us/people/sagarwal/sigcomm09-265.pdf >>, Applications, Technologies, Architectures, and Protocols for Computer Communication, Proceedings of the ACM SIGCOMM 2009 conference on Data communication, Aug. 16-21, 2009, pp. 12.

Ballani, et al., "A measurement-based deployment proposal for ip anycast", Retrieved at << http://conferences.sigcomm.org/imc/2006/papers/p22-ballani.pdf >>, Internet Measurement Conference, Proceedings of the 6th ACM SIGCOMM conference on Internet measurement, 2006, Oct. 25-27, 2006, pp. 14.

Gwertzman, et al., "The case for geographical pushcaching", Retrieved at << http://www.eecs.harvard.edu/~margo/papers/hotos95/paper.pdf >>, HOTOS, Proceedings of the Fifth Workshop on Hot Topics in Operating Systems (HotOS-V), May 4-5, 1995, pp. 1-4.

"3—DNS Reference Guide Version 4.2", *F5 Networks, Inc.*, (Mar. 1, 2010),260 pages.

Andrews, Matthew et al., "Clustering and Server Selection using Passive Monitoring", *In Proceedings of INFOCOM 2002*, Available at <http://citeseerx.ist.psu.edu/viewdoc/download?doi=10.1.1.16.8296&rep=rep1&type=pdf>,(Jun. 2002),pp. 1-10.

Huang, Cheng et al., "Measuring and Evaluating Large-Scale CDNs", *In Proceedings of IMC 2008*, Available at <http://www.cs.brown.edu/courses/csci2950-u/papers/CDN-measuring-IMC08-huang.pdf>,(Oct. 2008),14 pages.

Karger, David et al., "Web Caching with Consistent Hashing", Retrieved from: <http://www8.org/w8-papers/2a-webserver/caching/paper2.html> on Apr. 21, 2010, In Proceedings of WWW 1999,(May 1999),16 pages.

Kohavi, Ron et al., "Practical Guide to Controlled Experiments on the Web: Listen to Your Customers not to the HiPPO", *In Proceedings of KDD 207*, Available at <http://exp-platform.com/Documents/GuideControlledExperiments.pdf>,(Aug. 2007),9 pages.

Krishnan, Rupa et al., "Moving Beyond End-to-End Path Information to Optimize CDN Performance", *In Proceedings of IMC 2009*, Available at <http://cseweb.ucsd.edu/~hmadhyastha/papers/imc09.pdf>,(Nov. 2009),12 pages.

Oberheide, Jon et al., "Characterizing Dark DNS Behavior", *In Proceedings of DIMVA 2007*, Available at <http://www.merit.edu/networkresearch/papers/pdf/2007/dark_dns.pdf>,(Jul. 2007), pp. 140-156.

Partridge, C. "RFC1546: Host anycasting service", Retrieved from: <http://tools.ietf.org/html/rfc1546> on Apr. 21, 2010, Network Working Group,(Nov. 1993),10 pages.

Qureshi, Asfandyar et al., "Cutting the Electric Bill for Internet-Scale Systems", *In Proceedings of ACM SIGCOMM 2009*, Available at <http://nms.csail.mit.edu/papers/sigcomm372-agureshi.pdf>,(Aug. 2009),12 pages.

Shaikh, Anees et al., "On the Effectiveness of DNS-based Server Selection", *In Proceedings of INFOCOM 2001*, Available at <http://www.research.ibm.com/people/a/aashaikh/papers/infocom01.pdf>,(Apr. 2001),10 pages.

Stemm, Mark et al., "A Network Measurement Architecture for Adaptive Applications", *In Proceedings of INFOCOM 2000*, Available at <http://citeseerx.ist.psu.edu/viewdoc/download?doi=10.1.1.61.1599&rep=rep1&type=pdf>,(Mar. 2000),10 pages.

\* cited by examiner

300

302 Top Level DNS Server Receives, From A Local DNS Resolver, A DNS Query For A Network Address Corresponding To A Domain Name

304 Top Level DNS Server Returns Response Reflecting The Local DNS Resolver To A Reflector DNS Server In A Data Center To Obtain The Network Address

306 Reflector DNS Server Receives, From The Local DNS Resolver, A DNS Query For The Network Address Corresponding To The Domain Name

308 Reflector DNS Server Returns Response Reflecting The Local DNS Resolver To A Collector DNS Server In The Data Center To Obtain The Network Address

310 Collector DNS Server Receives, From The Local DNS Resolver, A DNS Query For The Network Address Corresponding To The Domain Name

312 Collector DNS Server Returns To The Local DNS Resolver A Response Including The Requested Network Address

314 Use Communications Between Local DNS Resolver And Both Reflector And Collector DNS Servers To Determine Network Performance Measurements Between Local DNS Resolver And Data Center

Fig. 3

USING DNS REFLECTION TO MEASURE NETWORK PERFORMANCE

BACKGROUND

Networked services are available that provide various functionality to users throughout the world. These networked services are oftentimes provided by server computers in data centers that are located in different geographic areas. The workload of a networked service can be spread across the different data centers so that different users access different ones of these data centers. However, it can be problematic to determine which of multiple data centers a particular user is to access.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspect, a reflector domain name system (DNS) server and a collector DNS server are included in a data center. A first DNS request for a network address corresponding to a domain name is received, at the reflector DNS server, from a local DNS resolver. A first response is returned to the local DNS resolver, the first response indicating to the local DNS resolver to obtain the network address from the collector DNS server. A second DNS request for the network address corresponding to the domain name is received, at the collector DNS server, from the local DNS resolver. A second response is returned to the local DNS resolver, the second response including the network address corresponding to the domain name. Based on two or more of the first request, the second request, the first response, and the second response, one or more network performance measurements for communications between the local DNS resolver and the data center are determined.

BRIEF DESCRIPTION OF THE DRAWINGS

The same numbers are used throughout the drawings to reference like features.

FIG. 3 is a flowchart illustrating an example process for a device implementing the using DNS reflection to measure network performance in accordance with one or more embodiments.

DETAILED DESCRIPTION

Using DNS reflection to measure network performance is discussed herein. A domain name system (DNS) query is resolved by reflecting the query to multiple different DNS servers in a data center, one of which provides a network address requested in the DNS query. One or more network performance measurements for communications between a local DNS resolver and the different DNS servers in the data center used in resolving the DNS query are determined during the resolution of the DNS query. These network performance measurements can include a round trip time indicating a communication delay between the local DNS resolver and the data center, and/or packet loss between the local DNS resolver and the data center. A record of the network performance measurements determined for different DNS queries is maintained and can be used to determine which data centers are to be accessed by which computing devices.

Figure 1:
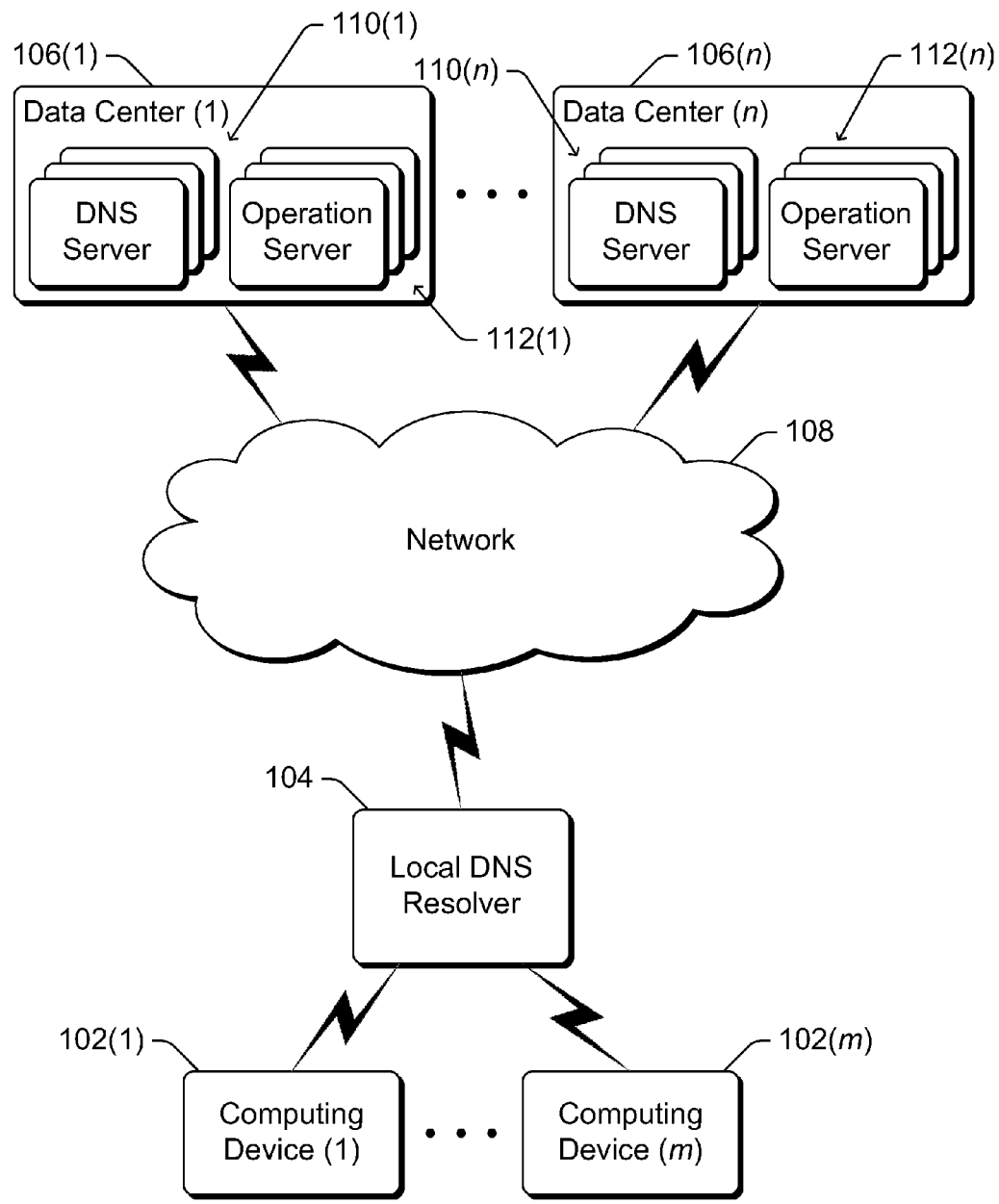
FIG. 1 illustrates an example system implementing the using DNS reflection to measure network performance in accordance with one or more embodiments.

FIG. 1 illustrates an example system 100 implementing the using DNS reflection to measure network performance in accordance with one or more embodiments. System 100 includes one or more (m) computing devices 102 that can communicate with a local DNS resolver 104. Local DNS resolver 104 can communicate with one or more (n) data centers 106 via a network 108. Network 108 can be a variety of different networks, including the Internet, a local area network (LAN), a public telephone network, an intranet, other public and/or proprietary networks, combinations thereof, and so forth. Computing devices 102 can communicate with local DNS resolver 104 directly, or alternatively via a network (e.g., a network analogous to network 108).

Each computing device 102 can be a variety of different types of devices. For example, a computing device 102 can be a desktop computer, a mobile station, an entertainment appliance, a set-top box communicatively coupled to a display device, a television, a cellular or other wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles). Different computing devices 102 can be the same or alternatively different types of computing devices.

Each data center 106 includes one or more DNS servers 110 and one or more operation servers 112. Operation servers 112 operate to provide one or more services to computing devices 102. For example, operation severs 112 can provide one or more of an information service (e.g., hosting one or more Web pages), a social networking service, an email service, a messaging service, an image and/or video sharing service, a file storage service, a gaming or other entertainment service, and so forth. DNS servers 110 operate to provide addresses of operation servers 112 to computing devices 102, allowing computing devices 102 to access and use the services provided by operation servers 112.

Similar to the discussion of computing devices 102 above, DNS servers 110 and operation servers 112 can be a variety of different types of computing devices, ranging from full resource devices with substantial memory and processor resources to low-resource devices with limited memory and/or processing resources. Each data center 106 typically includes multiple servers (e.g., on the order of tens, hundreds, or even more servers).

It should be noted that data centers 106 can be located in various places throughout the world. Data centers 106 are oftentimes physically located throughout the world in order to be geographically closer to different groups of users. However, two or more data centers 106 can be located in close geographic proximity to one another. The advantage of diversified geographic presence is to provide multiple choices of data centers for any particular end user, and, if done correctly, the end user will be served from the "optimal" data center, which yields the best perceived performance by the end user.

Operation servers 112 across the multiple data centers 106 operate collectively to provide one or more services to computing devices 102. Operation servers 112 in different data centers 106 can store duplicate data and/or work together to provide the one or more services to computing devices 102. Although operation servers 112 across multiple data centers 106 operate collectively, each computing device 102 typically communicates with the operation servers 112 of one data center 106. The using DNS reflection to measure network performance techniques discussed herein can be used to identify, for a particular computing device 102, which data center 106 is to be accessed by that particular computing device 102.

The using DNS reflection to measure network performance techniques discussed herein makes use of a DNS system. A DNS system allows services to be identified using a domain name (such as a Uniform Resource Locator (URL)) that is typically more easily used and referred to by users than network addresses (such as Internet Protocol (IP) v4 or v6 addresses). The operation servers 112 in data centers 106 have different network addresses, but correspond to the same domain name. Similarly, the multiple data centers 106 operating collectively to provide one or more services to computing devices 102 correspond to the same domain name. One or more DNS servers operate to map a particular domain name to a corresponding network address that can be used by a computing device to access a particular operation server. This mapping of a domain name to a corresponding network address is also referred to as DNS resolution.

Although many of the discussions herein refer to URLs and IP addresses, it is to be appreciated that other domain names and/or network addresses can be used with the using DNS reflection to measure network performance techniques discussed herein. Additionally, the DNS system discussed herein refers to a system in compliance with the well-known DNS protocol (e.g., as discussed in Network Working Group Request for Comments 1035, November 1987). However, it is to be appreciated that the using DNS reflection to measure network performance techniques discussed herein can be used in conjunction with other systems that, similar to the DNS protocol, allow domain names to be mapped to particular network addresses.

Local DNS resolver 104 receives DNS queries from computing devices 102 that are requests for IP addresses for particular URLs. Local DNS resolver 104 forwards these DNS queries to one or more DNS servers 110. When an IP address is returned to resolver 104 in response to a DNS query, the IP address is returned to the computing device 102 from which the DNS query was received. Additionally, local DNS resolver 104 can optionally maintain a cache that maps URLs to IP addresses, allowing local DNS resolver 104 to return, in response to a DNS query for a URL that is included in the cache, an IP address for that URL. Local DNS resolver 104 can be implemented in a variety of different devices, such as in a server or other device of an Internet Service Provider (ISP), in a device on a local area network that includes computing devices 102, and so forth. Although a single local DNS resolver 104 is illustrated in FIG. 1, it is to be appreciated that any number of local DNS resolvers 104 can be included in system 100.

For example, assume operation servers 112 work collectively to provide an Internet search engine. This Internet search engine can be easily identified using a simple URL, such as "www.bing.com". In order to access the Internet search engine, a computing device 102 submits a DNS query to local DNS resolver 104 requesting an IP address for the URL "www.bing.com". Local DNS resolver 104 in turn submits the DNS query to one or more DNS servers 110 requesting an IP address for the URL "www.bing.com". The particular DNS servers 110 to which local DNS resolver 104 submits the DNS query is discussed in more detail below. Eventually, a DNS server 110 returns to local DNS resolver 104 an IP address for the URL "www.bing.com". This IP address is the address of one of operation servers 112, and the local DNS resolver 104 returns this IP address to the computing device 102 from which the DNS query was received. The particular operation server 112 whose IP address is returned to local DNS resolver 104 can be selected by one or more DNS servers 110 in a variety of different manners. For example, the particular operation sever 112 can be selected as an operation server 112 in a data center 106 having a smallest communication delay between the computing device 102 that submitted the DNS query and the data center 106, an operation server 112 in a data center 106 having a smallest number of lost packets between the computing device 102 that submitted the DNS query and the data center 106, and so forth. The computing device 102 can subsequently access the Internet search engine using the IP address it received in response to the DNS query to access one of operation servers 112.

One or more of DNS servers 110 maintain a map of local DNS resolvers to IP addresses. This map indicates the particular IP address of an operation server 112 that is to be returned in response to a DNS query from local DNS resolver 104. It should be noted that this map is typically a mapping of local DNS resolvers to operation server IP addresses, although alternatively this map can be a mapping of computing devices 102 to operation server IP addresses.

Situations can arise where a DNS server receives a DNS query but delegates responsibility for returning the particular IP address of an operation server in response to the DNS query to another DNS server. DNS reflection refers to a specific usage of delegation, where one DNS server controls a delegation response in such a way that a querying local DNS resolver, upon receiving the response, will issue another DNS request to a second desirable DNS server.

During operation of system 100, one or more network performance measurements for communications between local DNS resolver 104 and one or more DNS servers 110 of a data center 106 are determined. These network performance measurements are determined as part of the process of returning an IP address for a URL submitted in a DNS query as discussed in more detail below. A record of these network performance measurements is maintained, and can be used as a basis for updating the map of local DNS resolvers to IP addresses that is maintained by DNS servers 110.

Figure 2:
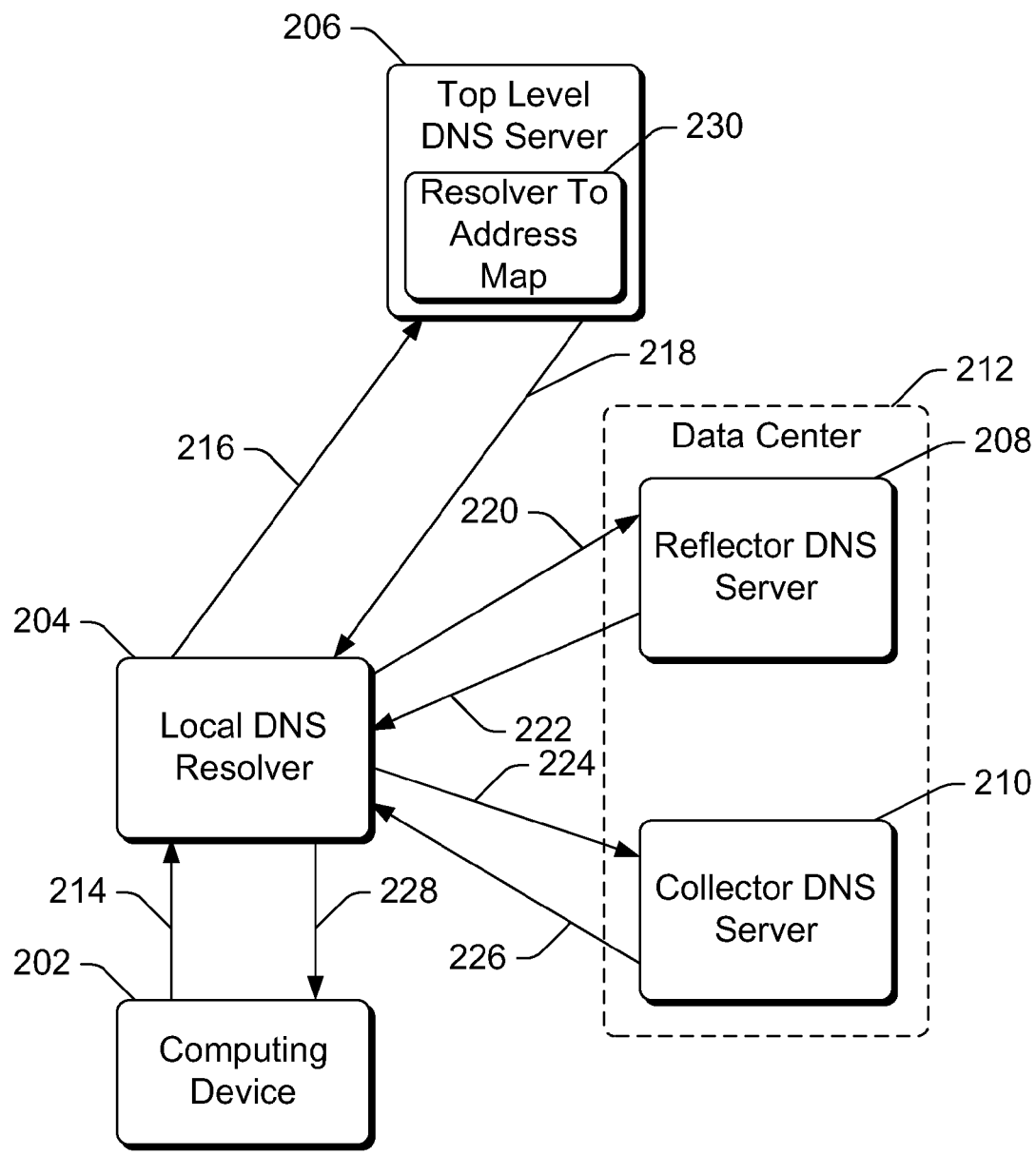
FIG. 2 illustrates an example system in which network performance measurements between a local DNS resolver and a data center are determined in accordance with one or more embodiments.

FIG. 2 illustrates an example system 200 in which network performance measurements between a local DNS resolver and a data center are determined in accordance with one or more embodiments. System 200 includes a computing device 202, a local DNS resolver 204, a top level DNS server 206, a reflector DNS server 208, and a collector DNS server 210. Computing device 202 can be, for example, a computing device 102 of FIG. 1. Local DNS resolver 204 can be, for example a local DNS resolver 104 of FIG. 1. Top level DNS server 206, reflector DNS server 208, and collector DNS server 210 can each be, for example, a DNS server 110 of FIG. 1. Reflector DNS server 208 and collector DNS server 210 are included in the same data center 212 (e.g., a particular data center 106 of FIG. 1). Top level DNS server 206 can be included in the same data center as reflector DNS server 208 and collector DNS server 210, or alternatively in a different data center.

Computing device 202 submits a DNS query 214 to local DNS resolver 204 requesting an IP address for a particular URL. This particular URL can also be referred to as the query URL or query domain name. Local DNS resolver 204 receives DNS query 214 and submits that DNS query as DNS query 216 to top level DNS server 206. Top level DNS server 206 is an authoritative name server (also referred to as a master name server) for that particular URL and maintains a mapping 230 of local DNS resolvers to IP addresses. Local DNS resolver 204 can obtain the IP address of top level DNS server 206 in a variety of different matters, such as receiving an indication of the IP address from top level DNS server 206, obtaining the IP address from another device (e.g., accessed via a network such as network 108 of FIG. 1) in accordance with the DNS system, and so forth.

In response to DNS query 216, top level DNS server 206 determines an IP address of an operation server in a data center to be returned to computing device 202. Top level DNS server 206 determines this IP address by looking up local DNS resolver 204 in map 230. This lookup can be based on the IP address of local DNS resolver 204 (which is included in DNS query 216), a name or other identifier of local DNS resolver 204, and so forth. Map 230 includes a mapping of local DNS resolver 204 to a particular IP address, which is the IP address of an operation server in a data center to be returned to computing device 202.

Top level DNS server 206 provides a response 218 to local DNS resolver 204 in response to DNS query 216. Response 218 includes an identifier of reflector DNS server 208 as well as an identifier of collector DNS server 210. Response 218 includes an indication to local DNS resolver 204 that top level DNS server 206 has delegated the DNS resolution to reflector DNS server 208. Response 218 also includes the IP address of the operation server to be returned to computing device 202, however, this IP address is included in response 218 in such a manner that local DNS resolver 204 does not understand that the IP address is included in response 218. Thus, local DNS resolver 204 requests the IP address from reflector DNS server 208, as discussed in more detail below.

In one or more embodiments, response 218 includes a CNAME, which is also referred to as an alias. The CNAME embeds IP addresses of reflector DNS server 208 and collector DNS server 210, and also a target IP address (which is the IP address of an operation server in a data center to be returned to computing device 202 as determined based on map 230). Reflector DNS server 208 and collector DNS server 210 can also be referred to as sub-domains servers for top level DNS server 206 because servers 208 and 210 can manage mapping local DNS resolvers to network addresses for portions of the domain for which top level DNS server 206 is the authoritative name server. Response 218 also includes a sub-domain server name and a sub-domain IP address indicating a server to which local DNS resolver 204 is to send DNS query 220, which are the name and IP address of reflector DNS server 208.

For example, response 218 can include a CNAME of: rand.lax.reflector-collector-target.msrapollo.net. In the CNAME, "reflector" is the IP address of reflector DNS server 208, "collector" is the IP address of collector DNS server 210, and "target" is the target IP address. Furthermore, response 218 can include a server name or NS of: ns.reflector-collector-target.msrapollo.net. This server name is the name of reflector DNS server 208. Response 218 can also include a server address or NS_ADDRESS of: reflector. This server address is the IP address of reflector DNS server 208.

Local DNS resolver 204 receives response 218 and determines (based on the indication in response 218) that the DNS resolution has been delegated to reflector DNS server 208. Although the target IP address is embedded in response 218, local DNS resolver 204 does not know how to interpret the embedded target IP address. Thus, in response to receiving response 218, local DNS resolver 204 submits DNS query 220 to reflector DNS server 208, requesting the IP address for the particular URL. DNS query 220 includes the IP address of the operation server to be returned to computing device 202 and also an identifier of collector DNS server 210, both of which were received by local DNS resolver 204 in response 218 (e.g., embedded in the CNAME). Thus, even though embedded within response 218 is the IP address of the operation server to be returned to computing device 202, local DNS resolver 204 submits DNS query 220 to reflector DNS server 208 because local DNS resolver 204 does not know how to interpret the embedded target IP address.

In one or more embodiments, response 218 includes the name and IP address of reflector DNS server 208, informing local DNS resolver 204 of the DNS server to which DNS query 220 is to be submitted. Local DNS resolver 204 includes, in DNS query 220, the CNAME received in response 218 as the domain name for which a network address is requested.

Reflector DNS server 208 receives DNS query 220, and in response to DNS query 220 generates a response 222 that includes an indication that reflector DNS server 208 has delegated the DNS resolution to collector DNS server 210. This is also referred to as reflecting the DNS query to collector DNS server 210. Response 222 also includes the IP address of the operation server to be returned to computing device 202 (which was determined by top level DNS server 206 and included in response 218 as discussed above).

In one or more embodiments, response 222 includes the CNAME which was received in DNS query 220. Response 222 also includes a sub-domain server name and a sub-domain IP address indicating a server to which local DNS resolver 204 is to send DNS query 224, which are the name and IP address of collector DNS server 210.

Local DNS resolver 204 receives response 222 and determines (based on the indication in response 222) that the DNS resolution has been delegated to collector DNS server 210. Although the target IP address is embedded in response 222, local DNS resolver 204 does not know how to interpret the embedded target IP address. Thus, in response to receiving response 222, local DNS resolver 204 submits DNS query 224 to collector DNS server 210, requesting the IP address for the particular URL. DNS query 224 includes the IP address of the operation server to be returned to computing device 202, which was received by local DNS resolver 204 in response 222 (e.g., embedded in the CNAME). Thus, even though embedded within response 222 is the IP address of the operation server to be returned to computing device 202, local DNS resolver 204 submits DNS query 224 to collector DNS server 210 because local DNS resolver 204 does not know how to interpret the embedded target IP address.

In one or more embodiments, response 222 includes the name and IP address of collector DNS server 210, informing local DNS resolver 204 of the DNS server to which DNS query 224 is to be submitted. Local DNS resolver 204 includes, in DNS query 224, the CNAME received in response 222 as the domain name for which a network address is requested.

Collector DNS server 210 receives DNS query 224, and in response to DNS query 224 generates a response 226 that includes the IP address of the operation server to be returned to computing device 202 (which was determined by top level DNS server 206 and included in response 218 and response 222 as discussed above). Local DNS resolver 204 receives response 226, and in response generates response 228 to send to computing device 202. Response 228 includes the IP address of the operation server to be returned to computing device 202 that was determined by top level DNS server 206 as discussed above.

In one or more embodiments, collector DNS server 210 obtains the target IP address, which is embedded in the CNAME received in DNS query 224, from DNS query 224. Collector DNS server 210 returns the target IP address to local DNS resolver 204 as the IP address of an operation server in a data center to be returned to computing device 202 as determined based on map 230.

In addition, one or more network performance measurements for communications between local DNS resolver 204 and data center 212 are determined. These network performance measurements can be round-trip times (RTTs) between local DNS resolver 204 and data center 212, and/or packet loss measurements between local DNS resolver 204 and data center 212. The network performance measurements for communications between local DNS resolver and data center 212 are determined based on communications between local DNS resolver 204 and servers 208 and 210.

A round-trip time for communications between local DNS resolver 204 and data center 212 can be determined by collector DNS server 210 or alternatively by another module or device. This round-trip time is determined as the amount of time that elapsed between the sending of response 222 to local DNS resolver 204 and the receiving of DNS query 224 by collector DNS server 210. Alternatively, this round-trip time can be determined in other manners, such as the amount of time elapsed between the receiving of DNS query 220 by reflector DNS server 208 and the receiving of DNS query 224 by collector DNS server 210. It is to be appreciated that a variety of different factors can influence this round-trip time, such as the distance between local DNS resolver 204 and data center 212, a number and/or type of devices in the network between local DNS resolver 204 and data center 212, the bandwidth of the network between local DNS resolver 204 and data center 212, an amount of traffic or congestion on the network between local DNS resolver 204 and data center 212, and so forth.

Packet loss measurements between local DNS resolver 204 and data center 212 can be determined in different manners. Communications between local DNS resolver 204 and DNS servers (e.g., servers 206, 208, and 210) are carried out by communicating information in packets over a network (e.g., network 108 of FIG. 1). Situations can arise where one or more packets that are sent over the network do not arrive at their intended destination and thus are referred to as being lost packets. The loss of one or more packets can be identified in different manners.

In one or more embodiments, the loss of a packet including a response 222 from reflector DNS server 208 to local DNS resolver 204 can be identified. Local DNS resolver 204 typically expects a response 222 to DNS query 220 within a particular amount of time, oftentimes referred to as a timeout period, of sending DNS query 220. If local DNS resolver 204 does not receive a response 222 within this timeout period, resolver 204 resends DNS query 220. Thus, if reflector DNS server 208 receives the same DNS query 220 multiple times, server 208 knows that a response 222 was not received by local DNS resolver 204. Reflector DNS server 208 can assume that a packet including response 222 was lost each time server 208 receives a same DNS query 220 that it previously received.

Additionally, although different local DNS resolvers can implement different timeout periods, these timeout periods are typically a fixed amount of time such as 0.5 seconds or 1 second. These timeout periods are typically much larger than round-trip times between local DNS resolver 204 and data center 212. Thus, timeout periods can be readily distinguished from round-trip times. Reflector DNS server 208 can determine the timeout period used by local DNS resolver 204 by not sending a response 222 to a DNS query 220. As no response 222 was sent, local DNS resolver 204 will resend the DNS query 220 after the timeout period used by local DNS resolver 204 elapses. Reflector DNS server 208 can determine the time that elapses between the initially sent DNS query 220 and the resent DNS query 220 (e.g., rounded to the closest half-second) as the timeout period used by local DNS resolver 204.

In one or more embodiments, the loss of a packet including a DNS query 224 from local DNS resolver 204 to collector DNS server 210 can be identified. Collector DNS server 210 knows to expect DNS query 224 after a response 222 is sent by reflector DNS server 208. If the amount of time between sending a response 222 and receiving DNS query 224 exceeds a threshold amount, collector DNS server 210 can assume that a packet including DNS query 224 was lost. This threshold amount of time can be based on the timeout period used by local DNS resolver 204, which can be determined as discussed above. If the amount of time between sending a response 222 and receiving DNS query 224 exceeds the timeout period used by local DNS resolver 204, then collector DNS server 210 can assume that a packet including DNS query 224 was lost.

In one or more embodiments, the loss of a packet including a response 226 from collector DNS server 210 to local DNS resolver 204 can be identified. Local DNS resolver 204 typically expects a response 226 to DNS query 224 within a particular amount of time, oftentimes referred to as a timeout period, of sending DNS query 224. This timeout period can be the same timeout period used by local DNS resolver 204 in expecting a response 222 to DNS query 220, or alternatively a different timeout period. If local DNS resolver 204 does not receive a response 226 within this timeout period, resolver 204 resends DNS query 224. Thus, if collector DNS server 210 receives the same DNS query 224 multiple times, server 210 knows that a response 226 was not received by local DNS resolver 204. Collector DNS server 210 can assume that a packet including response 226 was lost each time server 210 receives a same DNS query 224 that it previously received.

Similarly, the loss of multiple packets can be determined. Timeout periods can be different for different lost packets. For example, a first timeout of 1 second can be used after a first packet is lost, a second timeout of 2 seconds can be used if the next packet is lost, a third timeout of 3 seconds can be used if the next packet is lost, and so forth. These different timeout periods can be identified as discussed above (e.g., reflector DNS server 208 can determine the timeout periods used by local DNS resolver 204 by not sending response 222 to the first three DNS queries 220 received from local DNS resolver 204).

Alternatively, local DNS resolver 204 may include functionality to identify and maintain information regarding lost packets. In such situations, local DNS resolver 204 may also expose an interface, such as an application programming interface (API), which can be invoked (e.g., by reflector DNS sever 208 and/or collector DNS server 210) to obtain the information regarding lost packets from local DNS resolver 204.

Various information regarding the loss of packets can be maintained. This information regarding the loss of packets can include, for example, a packet loss ratio or frequency with which packets are lost, a packet loss pattern (e.g., a number of packets that are lost, consecutive packets being lost, time of day of packet loss, day of week of packet loss, etc.), and so forth.

The loss of one or more packets is typically identified by reflector DNS server 208 and/or collector DNS server 210, although alternatively the loss of one or more packets can be identified by another module or device of data center 212. In addition to identifying the loss of one or more packets, the direction in which such loss occurred can also be identified. That is, the loss of packets sent from data center 212 to local DNS resolver 204 can be identified separately from the loss of packets sent from local DNS resolver 204 to data center 212. Various information regarding the loss of packets in particular directions in which such losses occurred can be maintained.

Thus, as part of the DNS resolution process, network performance measurements for communications between the local DNS resolver and the data center are obtained. For each of multiple different local DNS resolvers, network performance measurements can be obtained between the local DNS resolver and multiple different data centers. A record of these obtained network performance measurements is maintained. This record can be maintained in different manners, such as one or more histograms. The network performance measurements between the local DNS resolvers and the data centers can be used to determine the mapping of a particular local DNS resolver to a particular operation server IP address of a data center (as stored in resolver to address map 230).

The network performance measurements between the local DNS resolvers and the data centers can be used to determine the mapping of a particular local DNS resolver to a particular operation server IP address of a data center in a variety of different manners. For a particular local DNS resolver, the obtained network performance measurements between that local DNS resolver and the different data centers can be compared or otherwise analyzed to select a data center. An IP address of an operation server in the selected data center is included in map 230. For example, the data center for which the smallest round-trip time measurement between the data center and the particular local DNS resolver is obtained can be selected. By way of another example, the data center for which the smallest number of lost packets between the data center and the particular local DNS resolver is obtained (or for which the smallest number of lost packets sent from the data center to the particular local DNS resolver is obtained) can be selected. Alternatively, the obtained round-trip time measurements and/or packet loss measurements can be used with a variety of other techniques or processes to select a data center.

In one or more embodiments, resolver to address map 230 includes an initial mapping for a particular local DNS resolver that can be updated over time based on the network performance measurements as discussed above. The initial mapping for a particular local DNS resolver can be obtained in a variety of different manners and based on a variety of different criteria, such as geographic location, the data centers to which other local DNS resolvers are mapped, random selection, other criteria or rules, and so forth. For example, top level DNS server 206 can identify an initial mapping for local DNS resolver 204 by analyzing prefixes in the network address of resolver 204 and mapping an operation server address to resolver 204 that is mapped to another local DNS resolver having the same prefixes. E.g., if local DNS resolver 204 has a network address of aaa.bbb.ccc.ddd, and another local DNS resolver in map 230 has a network address of aaa.bbb.ccc.eee, then these two local DNS resolvers have network addresses with the same prefix aaa.bbb.ccc, and top level DNS server 206 maps local DNS resolver 204 to the same operation server address as the local DNS resolver that has network address aaa.bbb.ccc.eee is mapped.

In one or more embodiments, local DNS resolver 204 can be reflected to reflector DNS server 208 and collector DNS server 210 in response to each DNS query that local DNS resolver 204 submits to top level DNS server 206. Alternatively, top level DNS server 206 can determine that local DNS resolver 204 is to be reflected to servers 208 and 210 only for particular DNS queries. These particular DNS queries can be identified in a variety of different manners, such as being based on a time interval, based on a frequency with which DNS queries are received, based on a number of DNS queries that have been previously reflected for a particular local DNS resolver, and so forth. For example, top level DNS server 206 can determine that one DNS query per hour for each local DNS resolver is to be reflected to servers 208 and 210. By way of another example, top level DNS server 206 can determine that each DNS query from a local DNS resolver is to be reflected to servers 208 and 210 until a threshold number of DNS queries have been reflected, after which one DNS query per hour for the local DNS resolver is to be reflected to servers 208 and 210. This threshold number can be a fixed number (e.g., 50 DNS queries), or alternatively a relative number (e.g., twice the number of data centers corresponding to the domain name).

Alternatively, other techniques can be used to obtain network performance measurements between data center 212 and local DNS resolver 204, and the using DNS reflection to measure network performance techniques discussed herein used when such other techniques are unsuccessful (or alternatively to confirm network performance measurements obtained via such other techniques). For example, a device in data center 212 (such as a device including reflector DNS server 208 and collector DNS server 210) can use a conventional ping request to obtain network performance measurements between data center 212 and local DNS resolver 204. Round-trip times and/or lost packets when using ping request can be identified using similar techniques to those discussed above. The using DNS reflection to measure network performance techniques discussed herein can be used to confirm the network performance measurements obtained using ping requests, or can be used in the event local DNS resolver 204 does not respond to the ping request.

By way of another example, a device in data center 212 (such as a device including reflector DNS server 208 and collector DNS server 210) can obtain network performance measurements by sending a DNS query to local DNS resolver 204. This DNS query can be a request to resolve a variety of different domain names, such as simply "." or ".com". Round-trip times and/or lost packets when submitting such DNS queries can be identified using similar techniques to those discussed above. The using DNS reflection to measure network performance techniques discussed herein can be used to confirm the network performance measurements obtained when submitting such DNS queries, or can be used in the event local DNS resolver 204 does not respond when submitting such DNS queries.

Additionally, it should be noted that local DNS resolver 204 can be reflected to reflector DNS server 208 and collector DNS server 210 in response to DNS queries for one or more particular domains. When top level DNS server 206 receives a DNS query for one of these one or more particular domains, local DNS resolver 204 is reflected to servers 208 and 210 as discussed above. However, when top level DNS server 206 receives a DNS query for a different domain, server 206 returns the requested network address from map 230 without reflecting local DNS resolver 204.

Having top level DNS server 206 reflect DNS queries only for one or more particular domains supports a variety of different usage scenarios. For example, a Web page to be returned to computing device 202 can have embedded therein a URL to a particular file. This particular file can be small in size, and need not even be displayed as part of the Web page. The URL to this particular file, however, is one of the one or more particular domains for which DNS queries are reflected. Thus, when the Web page is requested by computing device 202, the URL for the Web page is resolved and the network address is returned by top level DNS server 206 without reflecting the DNS query. The Web page can then be retrieved and displayed as computing device 202, and as part of this retrieving and displaying the embedded URL to the particular file is identified. This embedded URL, however, is resolved by reflecting the DNS query that includes that URL to reflector DNS server 208 and collector DNS server 210 as discussed above.

In the example of FIG. 2, one data center 212 is illustrated. However, multiple data centers correspond to a particular domain name as discussed above. Top level DNS server 206 can determine the particular data center to which a local DNS resolver is reflected in a variety of different manners, such as being based on a time interval, based on a frequency with which DNS queries are reflected to particular data centers, based on a number of DNS queries that have been previously reflected to each data center, based on geographic locations of the data centers, and so forth. For example, top level DNS server 206 can determine that one DNS query per hour for each local DNS resolver is to be reflected to each data center. By way of another example, top level DNS server 206 can maintain an ordered list of data centers and identify data centers in a round robin fashion, so each time server 206 determines that a DNS query is to be reflected to a particular data center, the next data center identified in the ordered list of data centers is selected as the data center to which the DNS query is reflected.

By way of yet another example, top level DNS server 206 can determine that if the network performance measurements obtained for the current data center to which a particular local DNS resolver is mapped are above a threshold amount, then that particular local DNS resolver need not be reflected to data centers that are not in close geographic proximity to that current data center. This threshold amount can be a fixed value (e.g., a round-trip time of less than 0.2 seconds) or a relative value (e.g., a round-trip time that is less than at least 70% of the round-trip times for the operation server addresses of the other mappings in map 230). The geographic proximity of data centers can be determined in different manners, such as a linear distance in miles, data centers located in the same city, data centers located in the same continents, and so forth. For example, if top level DNS server 206 determines that the network performance measurements obtained for the current data center to which a particular local DNS resolver is mapped are above a threshold amount, and the current data center is located in North America, then that particular local DNS resolver need not be reflected to data centers in Europe or Australia.

Reflector DNS server 208 and collector DNS server 210 have two different IP addresses and are viewed as two different servers by local DNS resolver 204. Nonetheless, in one or more embodiments reflector DNS server 208 and collector DNS server 210 are both implemented on the same computing device (e.g., having multiple network interfaces), allowing the same clock to be used by both servers 208 and 210. Allowing servers 208 and 210 to use the same clock simplifies obtaining the network performance measurements because clocks from two different devices need not be synchronized. Alternatively, reflector DNS server 208 and collector DNS server 210 can be implemented on two different computing devices, with the clocks on these two different computing devices being synchronized to one another.

It should be noted that the network performance measurements that are obtained using the techniques discussed herein are network performance measurements between a local DNS resolver and the data center. Similarly, a resolver to address map 230 is a mapping of local DNS resolvers to network addresses of operation servers in data centers. The network performance measurements obtained based on a DNS query from a particular computing device that is sent by the local DNS resolver are used for any additional computing devices could also use the same local DNS resolver. Thus, the various computing devices that use the same local DNS resolver will have DNS queries resolved to the same network address. For example, in addition to computing device 202, multiple additional computing devices can use local DNS resolver 204 to resolve DNS queries. Each of these multiple additional computing devices, as well as computing device 202, have the same DNS queries resolved to the same network addresses.

In the discussions above, resolver to address map 230 as discussed as being maintained by top level DNS server 206. Alternatively, map 230 can be maintained by other devices, such as the reflector DNS servers, the collector DNS servers, or other devices in the various data centers. Depending on the manner in which map 230 is maintained, copies of the map can be synchronized across different devices. For example, collector DNS servers in the various data centers can maintain map 230, and each change made to map 230 by a particular collector DNS server is communicated to the other collector DNS servers. In embodiments in which map 230 is maintained by a device other than top level DNS server 206, it is to be appreciated that the network address being requested in DNS query 216 would not be determined by server 206 and embedded in response 218 returned by server 206. Rather, the network address being requested in DNS query 216 would be determined by another device. For example, if map 230 is maintained by the collector DNS servers in the various data centers, then collector DNS server 210 determines the network address being requested in DNS query 216, and the network address is thus not included in DNS queries 220 and 224.

Additionally, in the discussions above a DNS query is discussed as being reflected to one reflector DNS server and one collector DNS server. However, it is to be appreciated that the using DNS reflection to measure network performance techniques discussed herein can be used to reflect a DNS query to multiple different DNS servers of within a data center. For example, rather than reflecting the local DNS resolver 204 to collector DNS server 210, the local DNS resolver 204 can be reflected to multiple different reflector DNS servers 208 within data center 212. Network performance measurements for these additional reflections can be obtained analogous to the discussion above regarding obtaining measurements. Furthermore, it is to be appreciated that the using DNS reflection to measure network performance techniques discussed herein can be used to reflect a DNS query to multiple different reflector and collector DNS servers of multiple different data centers. For example, rather than returning the requested network address, collector DNS server 210 can reflect DNS queries from local DNS resolver 204 to the reflector DNS server of an additional data center corresponding to the domain name. Network performance measurements for this additional data center can be obtained analogous to the measurements obtained for data center 212 as discussed above.

In the discussions of FIG. 2, reflector DNS server 208 and collector DNS server 210 are discussed as being separate DNS servers. Local DNS resolver 204 is typically configured so as to not resend a DNS query to the same DNS server after resolver 204 has received a response from that DNS server. Accordingly, two different DNS servers 208 and 210 are used in FIG. 2. If local DNS resolver 204 were to support resending of a DNS query to the same DNS server after resolver 204 has received a response from that DNS server, then reflector DNS server 208 and collector DNS server 210 can be the same DNS servers.

FIG. 3 is a flowchart illustrating an example process 300 for a device implementing the using DNS reflection to measure network performance in accordance with one or more embodiments. Process 300 can be implemented in software, firmware, hardware, or combinations thereof. Process 300 is shown as a set of acts and is not limited to the order shown for performing the operations of the various acts. Process 300 is an example process for using DNS reflection to measure network performance; additional discussions of using DNS reflection to measure network performance are included herein with reference to different figures.

In process 300, a top level DNS server receives a DNS query for a network address corresponding to a domain name (act 302). This DNS query is received from a local DNS resolver, and the domain name is typically identified as a URL as discussed above. The requested network address can be an IP address or alternatively another address as discussed above.

The top level DNS server returns a response to the local DNS resolver that reflects the local DNS resolver to another server to obtain the network address (act 304). This other server is a reflector DNS server included in a data center that is typically (but need not be) a different data center than the data center that includes the top level DNS server.

The reflector DNS server receives a DNS query for the network address corresponding to the domain name (act 306). This DNS query in act 306 is received from the local DNS resolver and the reflector DNS server that receives this DNS query in act 306 is the reflector DNS server indicated by the top level DNS server in act 304.

The reflector DNS server returns a response to the local DNS resolver that reflects the local DNS resolver to yet another server to obtain the network address (act 308). This other server to which the local DNS resolver is reflected is a collector DNS server included in the same data center as the reflector DNS server. Alternatively, one or more reflector DNS servers can reflect the local DNS resolver to another reflector DNS server before a reflector DNS server eventually reflects the local DNS resolver to a collector DNS server.

The collector DNS server receives a DNS query for the network address corresponding to the domain name (act 310). This DNS query in act 310 is received from the local DNS resolver and the collector DNS server that receives this DNS query in act 310 is the collector DNS server indicated by the reflector DNS server in act 308.

The collector DNS server returns, to the local DNS resolver, a response including the requested network address corresponding to the domain name (act 312). The collector DNS server can identify the network address in different manners, such as identifying the network address as embedded in the DNS query received by the collector DNS server, by accessing a table or other record of network addresses, and so forth as discussed above. As the response returned by the collector DNS server effectively terminates the DNS reflection operation, the query received in act 310 can also be referred to as the final DNS query, and the response return in act 312 can also be referred to as the final DNS response.

Additionally, the communications between the local DNS resolver in both reflector DNS server and collector DNS server are used to determine network performance measurements (act 314). These network performance measurements are measurements of network performance for communications between the local DNS resolver and the data center that includes both reflector DNS server and the collector DNS server. Different network performance measurements can be identified in act 314, such as round-trip times and packet loss information as discussed above.

Thus, it can be seen that the using DNS reflection to measure network performance techniques discussed herein leverage the DNS system to obtain network performance measurements based on actual communications between local DNS resolvers and data centers. The reflecting of DNS queries to another server is supported by typical local DNS resolvers as part of their normal operation, and thus no alteration to typical existing local DNS resolvers need be made to support the using DNS reflection to measure network performance techniques discussed herein. Furthermore, the local DNS resolvers need not be configured to respond to additional requests (such as ping requests) to which they would not otherwise be configured to respond.

Furthermore, the using DNS reflection to measure network performance techniques discussed herein is employed during the DNS resolution process. Requests for and/or responses to requests for data maintained by an operation server of a data center are typically not affected. In other words, the using DNS reflection to measure network performance techniques discussed herein affect which servers are accessed when resolving a DNS query, not which servers are accessed in obtaining requested data from an operation server of a data center.

Figure 4:
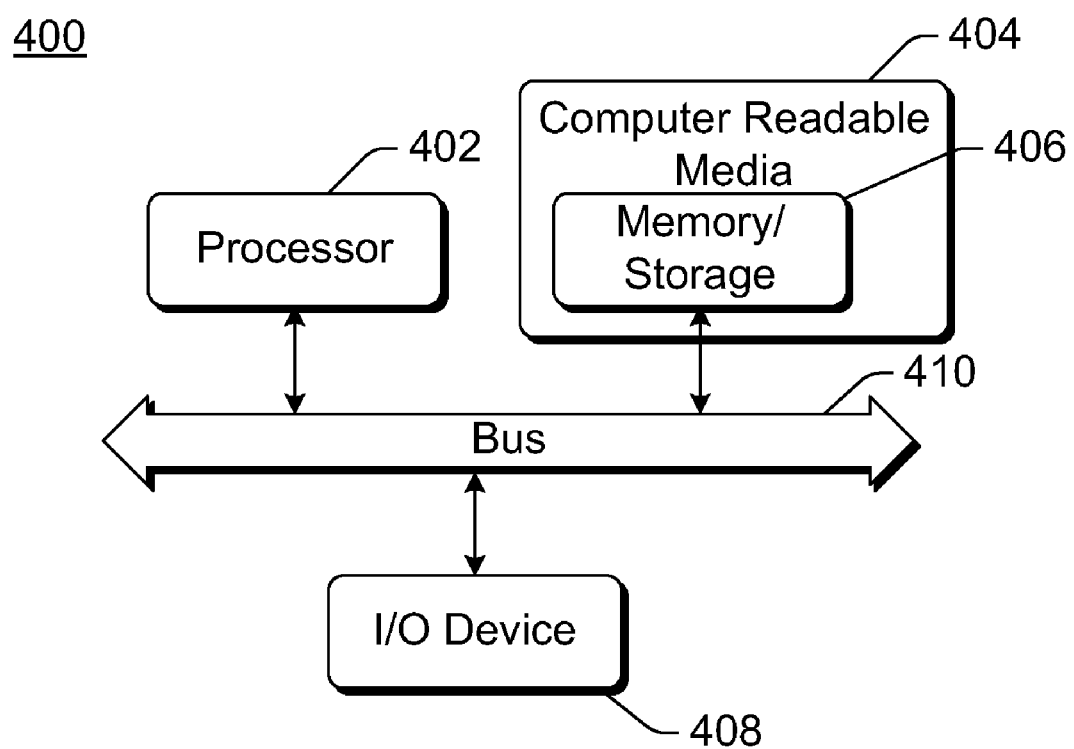
FIG. 4 illustrates an example computing device that can be configured to implement the using DNS reflection to measure network performance in accordance with one or more embodiments.

FIG. 4 illustrates an example computing device 400 that can be configured to implement the using DNS reflection to measure network performance in accordance with one or more embodiments. Computing device 400 can, for example, be computing device 102 of FIG. 1 or computing device 202 of FIG. 2, or be used to implement any of local DNS resolver 104, DNS servers 110, and operation servers 112 of FIG. 1, or any of resolver 204, top level DNS server 206, reflector DNS server 208, and collector DNS server 210 of FIG. 2.

Computing device 400 includes one or more processors or processing units 402, one or more computer readable media 404 which can include one or more memory and/or storage components 406, one or more input/output (I/O) devices 408, and a bus 410 that allows the various components and devices to communicate with one another. Computer readable media 404 and/or one or more I/O devices 408 can be included as part of, or alternatively may be coupled to, computing device 400. Bus 410 represents one or more of several types of bus structures, including a memory bus or memory controller, a peripheral bus, an accelerated graphics port, a processor or local bus, and so forth using a variety of different bus architectures. Bus 410 can include wired and/or wireless buses.

Memory/storage component 406 represents one or more computer storage media. Component 406 can include volatile media (such as random access memory (RAM)) and/or non-volatile media (such as read only memory (ROM), Flash memory, optical disks, magnetic disks, and so forth). Component 406 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 402. It is to be appreciated that different instructions can be stored in different components of computing device 400, such as in a processing unit 402, in various cache memories of a processing unit 402, in other cache memories of device 400 (not shown), on other computer readable media, and so forth. Additionally, it is to be appreciated that the location where instructions are stored in computing device 400 can change over time.

One or more input/output devices 408 allow a user to enter commands and information to computing device 400, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 4. The features of the using DNS reflection to measure network performance techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, at a first domain name system (DNS) server of a first data center, a first DNS query from a local DNS resolver, the first DNS query requesting a network address corresponding to a query domain name;
   responding to the first DNS query, from the first DNS server, by reflecting the local DNS resolver to one or more reflector DNS servers of a second data center, both the first data center and the second data center corresponding to the query domain name, the responding to the first DNS query from the first DNS server including generating a response that is returned to the local DNS resolver by the first DNS server, the response including both an additional network address of one of the one or more reflector DNS servers, and the network address corresponding to the query domain name to be included in responding to the final DNS query;
   receiving, at the one or more reflector DNS servers, one or more additional DNS queries;
   responding to a final DNS query, from a collector DNS server, with the network address corresponding to the query domain name; and
   determining, based on communications between the local DNS resolver and the one or more reflector DNS servers and the collector DNS server of the second data center, one or more network performance measurements for communications between the local DNS resolver and the second data center.

2. A method as recited in claim 1, wherein the network address is an Internet Protocol (IP) address of a server in a third data center corresponding to the query domain name.

3. A method as recited in claim 1, wherein the one or more network performance measurements include a round-trip time of communication between the second data center and the local DNS resolver determined as an amount of time that elapses between a first request from the local DNS resolver received at a first of the one or more reflector DNS servers and a second request from the local DNS resolver received at a second of the reflector DNS servers or the collector DNS server.

4. A method as recited in claim 1, wherein the one or more network performance measurements include a round-trip time of communication between the second data center and the local DNS resolver identified by the local DNS resolver.

5. A method as recited in claim 1, wherein the one or more network performance measurements include a packet loss ratio or packet loss pattern between the second data center and the local DNS resolver.

6. A method as recited in claim 5, wherein the one or more network performance measurements include a first number that is a packet loss ratio or first measurement of packet loss pattern for packets that were sent from one or more DNS servers in the second data center to the local DNS resolver, and a second number that is a packet loss ratio or a second measurement of packet loss pattern for packets that were sent from the local DNS resolver to the one or more DNS servers in the second data center.

7. A method as recited in claim 1, wherein the collector DNS server is included in the second data center.

8. A method as recited in claim 1, wherein responding to the first DNS query comprises including in the response an alias in which the network address corresponding to the query domain name is embedded, wherein receiving one or more additional DNS queries comprises receiving one or more additional DNS queries including the alias, and the method further comprising obtaining, at the collector DNS server, the network address corresponding to the query domain name from the alias.

9. A method as recited in claim 1, wherein the one or more reflector DNS servers and the collector DNS server are implemented on a same computing device in the second data center, the computing device having multiple network interfaces.

10. A method comprising:
receiving, at a top level domain name system (DNS) server of a first data center, a first DNS query from a local DNS resolver, the first DNS query requesting a network address corresponding to a query domain name;
responding to the first DNS query, from the top level DNS server, by sending a first response which reflects the local DNS resolver to a reflector DNS server of a second data center, both the first data center and the second data center corresponding to the query domain name, wherein the network address corresponding to the query domain name is embedded in an alias of the first response, and wherein the first response includes an additional network address of the reflector DNS server;
receiving, at the reflector DNS server, a second DNS query from the local DNS resolver, wherein the network address is embedded in the second DNS query;
responding to the second DNS query, from the reflector DNS server, by sending a second response reflecting the local DNS resolver to a collector DNS server of the second data center, wherein the network address is embedded in the second response;
receiving, at the collector DNS server, a third DNS query from the local DNS resolver, wherein the network address is embedded in the third DNS query;
responding to the third DNS query, from the collector DNS server, with a third response including the network address, wherein the collector DNS server obtains the network address from the third DNS query; and
determining, based on communications between the local DNS resolver and both the reflector DNS server and the collector DNS server, one or more network performance measurements for communications between the local DNS resolver and the second data center.

11. One or more computer storage devices having stored thereon multiple instructions execution of which, by one or more processors of one or more computing devices in a data center, cause the one or more processors to:
receive, at a reflector domain name system (DNS) server, a first DNS request for a network address corresponding to a domain name, the first DNS request being received from a local DNS resolver;
return, to the local DNS resolver, a first response reflecting the local DNS resolver to a collector DNS server, the first response including both an additional network address of the collector DNS server and the network address corresponding to the domain name;
receive, at the collector DNS server, a second DNS request for the network address corresponding to the domain name, the second DNS request being received from the local DNS resolver;
return, to the local DNS resolver, a second response including the network address corresponding to the domain name; and
determine, based on two or more of the first request, the second request, the first response, and the second response, one or more network performance measurements for communications between the local DNS resolver and the data center.

12. One or more computer storage devices as recited in claim 11, wherein both the reflector DNS server and the collector DNS server are implemented in a same computing device having multiple network interfaces.

13. One or more computer storage devices as recited in claim 11, wherein both the first DNS request and the second DNS request include an alias obtained by the local DNS resolver from a third DNS server, wherein a target address that is the network address corresponding to the domain name is embedded in the alias.

14. One or more computer storage devices as recited in claim 11, wherein both the reflector DNS server and the collector DNS server are included in a same data center, and wherein the one or more network performance measurements include a round-trip time of communication between the data center and the local DNS resolver determined as an amount of time that elapses between the first request and the second request, wherein the first request and the second request are two subsequent requests from the local DNS resolver.

15. One or more computer storage devices as recited in claim 11, wherein both the reflector DNS server and the collector DNS server are included in a same data center, and wherein the one or more network performance measurements include a histogram of round-trip times of communication between the data center and the local DNS resolver determined as amounts of time that elapse between subsequent requests received by the reflector and collector DNS servers.

16. One or more computer storage devices as recited in claim 11, wherein both the reflector DNS server and the collector DNS server are included in a same data center, and wherein the one or more network performance measurements include information regarding packet loss between the data center and the local DNS resolver.

17. One or more computer storage devices as recited in claim 16, wherein the information regarding packet loss between the data center and the local DNS resolver comprises a packet loss ratio between the data center and the local DNS resolver.

18. One or more computer storage devices as recited in claim 17, wherein the instructions further cause the one or more processors to delay return of the second response to the local DNS resolver until the second DNS request has been resent by the local DNS resolver, and wherein to determine the one or more network performance measurements is to identify, based on an amount of time between receipt of the second DNS request and receipt of the resent second DNS request, a timeout period used by the local DNS resolver, and determine the one or more network performance measurements based at least in part on the timeout period.

19. One or more computer storage devices as recited in claim 16, wherein the information regarding packet loss between the data center and the local DNS resolver comprises a first pattern of lost packets that were sent from the data center to the local DNS resolver, and a second pattern of lost packets that were sent from the local DNS resolver to the data center.

* * * * *